United States Patent Office 3,210,907
Patented Oct. 12, 1965

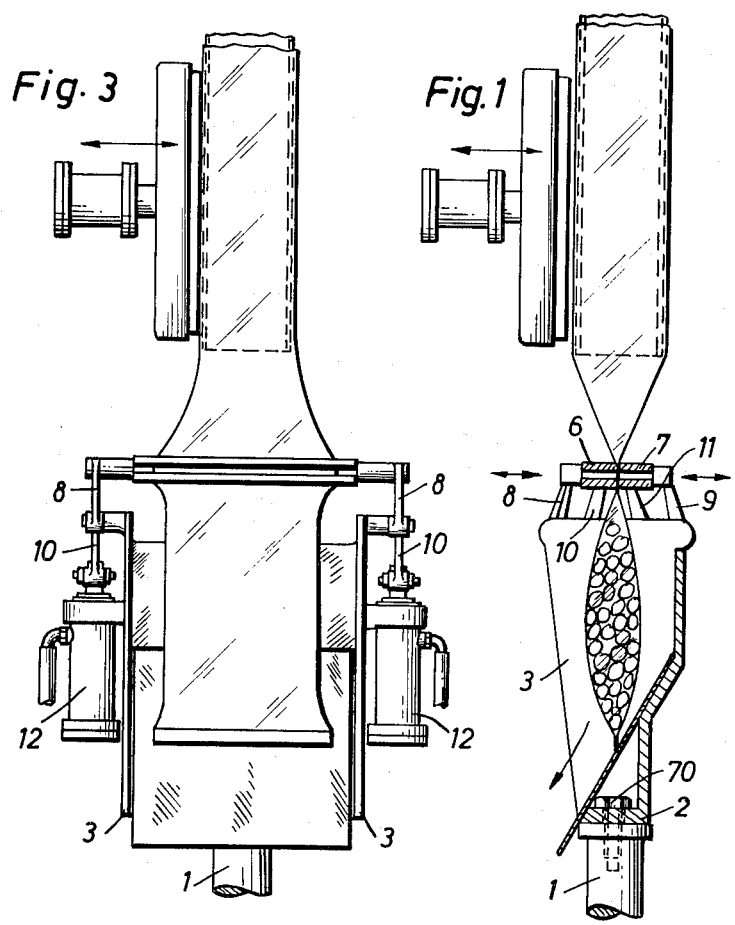

3,210,907
PACKAGING MACHINE WITH ADJUSTABLE
SEALING JAWS
Hermann Thürlings, Viersen, Rhineland, Germany, assignor to Hamac-Hansella Aktiengesellschaft, Viersen, Germany, a corporation of Germany
Filed Jan. 9, 1963, Ser. No. 250,430
Claims priority, application Germany, Jan. 12, 1962,
H 44,597
1 Claim. (Cl. 53—180)

This invention relates to packaging machines of the type which produce filled and sealed packages or bags from a tube of heat-sealable packaging material.

In these machines, a continuous web of packaging material is pulled over a forming element which surrounds a filling pipe. The forming element forms the web into a tube with the longitudinal margins of the web in overlapping relation. A heated tool cooperates with the filling pipe for fusing the overlapping margins to form a continuous longitudinal seam. Successive charges of the merchandise to be packaged are introduced into the tube through the filling pipe. A pair of heated sealing jaws is provided on opposite sides of the tube below the filing pipe, the jaws being movable in a direction transverse to the longitudinal axis of the tube between an open and a closed position, in order to form successive transverse seals in the tube. In addition, the jaws are movable longitudinally, while in closed position, in order to advance the tubular material through the machine.

In my co-pending application, Serial No. 250,426, filed January 9, 1963, now Patent No. 3,159,955, a machine of this type is described in which a pneumatic arrangement is provided for producing the transverse movement of the jaws, the pneumatic arrangement (including piston-cylinder device and associated transmission linkages) being movable longitudinally with the sealing jaws. It was pointed out in that application that it was advantageous to mount the sealing jaws, and pneumatic arrangement on a post mounted for longitudinal movements.

It has now been found that by a very simple improvement certain other advantages can be achieved in a machine of this character. More particularly, the improvement consists in providing for a connection between the longitudinally movable post and the support for the jaws and pneumatic arrangement which can be loosened and re-tightened to permit relative rotation between the jaws and the post. The chief advantage of this arrangement is that the sealing jaws can be selectively adjusted throughout an angle of 360°, the sealing jaws being operable to produce the transverse seals at any angular setting. Consequently, the transverse seals can be formed in any desired relationship to the longitudinal seam of the packaging tube.

These objectives and advantages will be apparent from the following description and the accompanying drawings.

In the drawings:

FIG. 1 is an elevational view of a machine embodying the features of this invention, the jaws being shown in one selected setting;

FIG. 2 is a cross-sectional view of the bag or package that is produced when the parts are in the relationship shown in FIG. 1;

FIG. 3 is a view similar to FIG. 1 showing the parts in another relationship;

FIG. 4 is a cross-sectional view of a bag similar to that of FIG. 2 showing the bag as formed when the parts are arranged as in FIG. 3;

FIG. 4a is a front elevational view of the bag shown in FIG. 4;

FIG. 5 is a view similar to FIG. 4 showing another alternative bag; and

FIG. 5a is a front elevational view of the bag of FIG. 5.

As described in the co-pending application hereinbefore mentioned, the operating head of the machine is composed of a platform-like support 2 provided with spaced parallel wings 3. Each wing carries a pneumatic piston-cylinder device 12, and two double-armed levers 10 and 11 which transmit motion from the piston-cylinder device to the jaws 6 and 7, respectively. Additional links 8 and 9, pivotally connected between the jaws 6 and 7, respectively, and each wing 3, aid in supporting the jaws. The platform 2 is L-shaped in cross-section at its lower end (see FIG. 1). A threaded bore is formed at the upper end of a post 1, which is movable back and forth longitudinally by power means (not shown), and the entire operating head is secured to the post by a simple bolt 70. Above the jaws 6 and 7 is a filling pipe, through which material to be packaged is introduced, in successive charges, into the tube. The tube is formed from a continuous web of initially flat stock which is drawn around a forming element (not shown) surrounding the filling pipe to form it into a tube with the longitudinal margins of the web in overlapping relationship. A heated tool, movable in the direction of the double-headed arrow cooperates with the filling pipe to fuse the overlapping margins and to form a longitudinal seam.

The piston-cylinder devices 12 are operative to move the jaws 6 and 7 in the direction of the double-headed arrows in order to produce a series of transverse seals in the tube. While the jaws are in closed, seal-forming relation, the post 1 moves downwardly to advance the tubular material. The jaws then open and the post 1 returns to its initial position.

If the operating head is in the position shown in FIG. 1 bags of the type shown in FIG. 2 are produced, in which the longitudinal seam extends along the center of the rear panel of the bag. In this case, the bags are discharged from the apparatus in the direction of the arrow pointing downwardly and to the left in FIG. 1.

In the event that the packaging material being used is printed across its entire width, so that there will be printing not only on the front face of the bag produced (as is usual) but also on the rear face, the bolt 70 is loosened, the working head is rotated through 90°, and the bolt 70 is retightened. The working head will then be adjusted as shown in FIG. 3. Consequently, the bag shown in FIG. 4 will be produced, in which the longitudinal seam lies along one longitudinal edge. In this case, the bags are discharged from the machine forwardly as viewed in FIG. 3.

Of course, even when only one face, or neither face, of the bag is printed, it may be desirable to have the machine operate as shown in FIG. 3. As shown in FIGS. 4 and 4a, the resultant bag has four layers of material and thickened or reinforced corners A and B. These reinforced corners lend themselves readily to being used as starting points for the tearing operation of the bag when the bags are to be opened.

In some cases, for example if the packaging material is such that the longitudinal seam of the tube cannot readily be folded as shown in FIG. 4, it may be desirable to provide the longitudinal seam directly adjacent to one edge of the bag as shown in FIGS. 5 and 5a. In such a case the operating head of the machine is adjusted less than 90° from the position of FIG. 1, for example, 85°.

As the above illustrations indicate, the operating head of the machine may be set in any desired position between 0° and 360° in order to position the longitudinal seam at any desired location on the finished bag.

What is claimed is:

In a packaging machine for use with a continuous web of packaging material which is formed into a tube surrounding a filling pipe through which merchandise to be packaged is introduced into the tube, the longitudinal margins of the web being in overlapping relationship and including a heated tool cooperating with the filling pipe to fuse said overlapping margins in order to form a longitudinal seam:

a pair of sealing jaws mounted on a support on opposite sides of the tube, means mounted on said support for moving said jaws into engagement to produce a transverse seal in said tube, a post movable longitudinally, said support resting on one end of said post, and a releasable means for rotatably securing said support to said post so that said support may be rotated about the longitudinal axis of the post to any position between 0° and 360° in order to vary the relative position of said transverse seal and longitudinal seam.

References Cited by the Examiner

UNITED STATES PATENTS 1,686,787  10/28  Bates _____ 53—180 X

FRANK E. BAILEY, *Primary Examiner.*

TRAVIS S. McGEHEE, GRANVILLE Y. CUSTER, Jr., *Examiners.*